Sept. 2, 1958  
D. W. RUDORFF  
APPARATUS FOR CUTTING AND WORKING ELECTRICALLY CONDUCTIVE MATERIALS  
Filed Oct. 20, 1953  
2,850,618
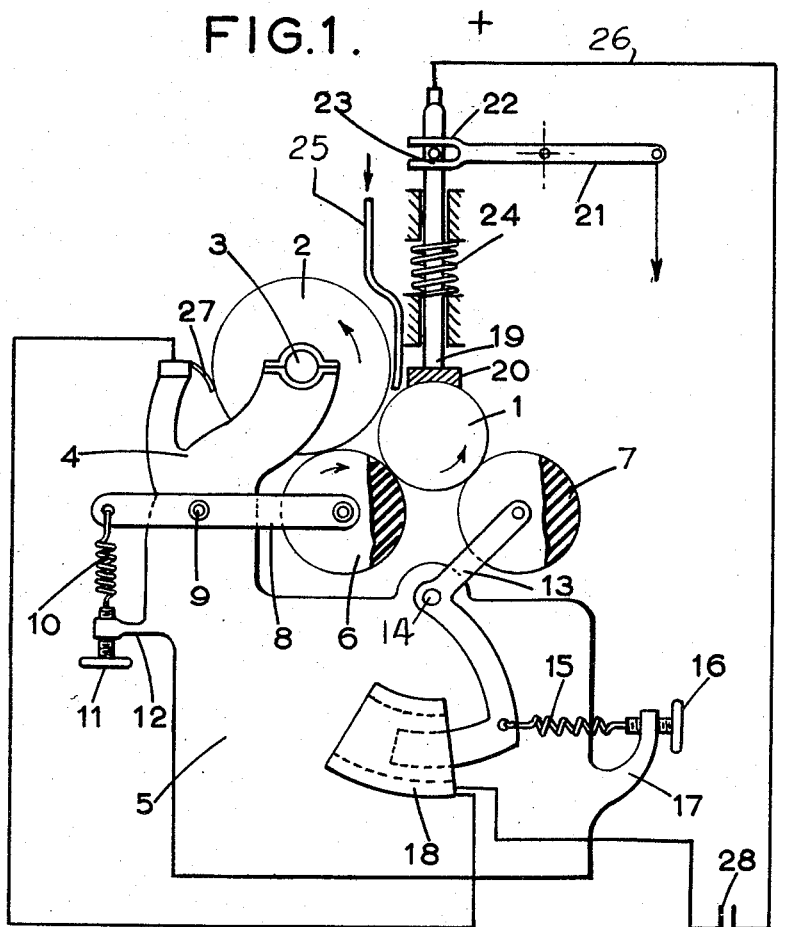
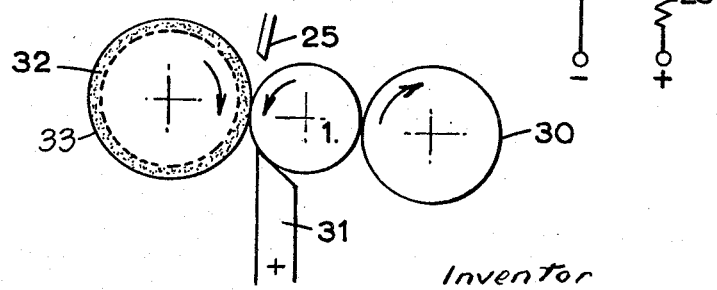
Inventor  
D. W. Rudorff  
By Shoemaker & Mattare  
Attorneys

United States Patent Office 2,850,618
Patented Sept. 2, 1958

2,850,618

APPARATUS FOR CUTTING AND WORKING ELECTRICALLY CONDUCTIVE MATERIALS

Dagobert William Rudorff, London, England, assignor to Sparcatron Limited, Abbey Yard, Bath, England, a body corporate of Great Britain Application October 20, 1953, Serial No. 387,190

2 Claims. (Cl. 219—69)

This invention relates to methods and apparatus for cutting or working electrically conductive materials more especially hard metals such as metal carbides, tool steels and stainless steels electrolytically or by means of electric spark and/or arc discharges as described in patent specification No. 2,526,423.

It is an object of the present invention to provide an improved method and apparatus by means of which accurate machining of surfaces of rotation may be more readily achieved and which at the same time are more economical in the consumption of electric current and of electrode material.

In the method of working materials electrolytically or by electro-erosion according to the present invention, a workpiece is freely supported for rotation between a rotating electrode and a supporting member or supporting members and rotation of the workpiece is induced by the rotation of the electrode or the supporting member or members.

Advantageously, in apparatus according to the invention the workpiece is arranged without separate bearings determining its axis of rotation in a manner conventionally adopted in centreless grinding machines, so that it rotates freely between the working electrode and supporting rollers except that the latter or their bearings are insulated in relation to the working surface of the working electrode which is normally maintained of negative polarity while the workpiece is rendered positive, the input circuits being suitably as described in the aforementioned specification, the current being fed to the workpiece either through the supporting rollers or through brushes which may also serve as supplementary bearers or guide blocks for the workpiece during operation.

Preferably also, provision is made for continuously bathing the working zone during operation with a fluid which may be an electrolyte or a dielectric fluid and which as described in specification No. 2,526,423 may serve the additional purpose of removing the swarf from the working zone.

The improved method may be used for grinding or finishing axle or bearing journals of large diameter and the supporting rollers and brushes or guide blocks may be situated at one or both ends of the working electrode, if desired outside the surface of the workpiece being finished.

In another arrangement, the negative working electrode comprises a pair of rotors driven in tandem in the same direction of rotation, the workpiece being adapted to be in rolling relation with both members and with a third roller and/or guide block insulated and conveniently serving to transmit current to the workpiece which is the positive electrode during operation.

The invention will be further described with reference to the accompanying drawings which illustrate by way of example two embodiments of apparatus for carrying out the invention and in which in Figure 1 the workpiece and electrode rotate in the same direction while Figure 2 is a schematic illustration of a modified form of apparatus in which the workpiece and electrode rotate in opposite directions.

Referring first to the embodiment of apparatus illustrated in Figure 1 the workpiece generally designated 1 is arranged in the manner analogous to that conventionally adopted in centreless grinding machines so that it rotates between a working electrode, which may be in the form of a disc, wheel or cylinder 2 journalled at 3 for rotation on a headstock 4 of a machine bed or frame 5, and supporting rollers 6 and 7 for said workpiece. The supporting roller 6 is journalled at one end of a pair of rocker arms 8 pivotally mounted at 9 on the before mentioned headstock 4 and is yieldingly urged into engagement with the working electrode 2 by adjustable spring means 10 carried by the other end of the rocker arms 8. The tension of the spring 10 is adjusted by a hand wheel 11 carried by a bracket 12 attached to the machine frame.

The roller 6, which is of insulating material being in frictional engagement with the working electrode 2 is rotated thereby in an opposite direction and at the same peripheral speed as the working electrode.

The workpiece 1 is spaced a short distance away from the working electrode 2 and rotation of such workpiece is induced by the oppositely rotating supporting roller 6 in the same counter-clockwise direction as the working electrode 2 and at the same peripheral speed, although as will be appreciated the working faces are moving in opposite directions.

The gap between the electrode 2 and workpiece 1 is adjusted by the second supporting roller 7 which is insulated or of insulating material and bears on the workpiece 1.

The roller 7 is mounted at one end of an arm 13 pivotally mounted at 14 to the machine frame 5 the said arm 13 urging the roller into engagement with the workpiece 1 by adjustable spring means consisting of a spring 15 and adjusting hand wheel 16 mounted in a bracket 17 carried by or formed integral with the machine frame 5. The end of the arm 13 remote from the supporting roller 7 carries the armature of, or is operatively associated with, a solenoid 18 actuation of which working in conjunction with the spring 15 adjusts the gap between the workpiece 1 and the electrode 2. Alternatively, the position of the roller 7 may be regulated by a split field motor.

A spring pressed plunger 19 carries a shoe brush member 20 bearing on the upper surface of the workpiece 1 such plunger being raised to release the workpiece by means of a pivoted lever 21 forked at 22 to accommodate a pin 23 at the upper end of the plunger 19 so that by rocking the lever 21 about its pivot the plunger 19 and associated shoe 20 is raised against the resistance of a spring 24 to release the workpiece 1.

Dielectric fluid is supplied to the workpiece 1 and electrode 2 by means of a feed pipe 25.

The upper end of the plunger 19 is connected to a source of potential by a lead 26 to maintain the workpiece at positive polarity while the polarity of the working electrode 2 is maintained negative by means of a brush or slip ring or the like 27. The electric circuit includes a shunt condenser 28, a resistance 29 and the solenoid 18 for adjusting the gap between the workpiece and electrode.

With the arrangement shown the peripheral speed of the workpiece 1 is substantially the same as that of the electrode 2 but as one has a longer circumference or periphery than the other, and the working faces move in opposite direction accurate cylindrical grinding or working is effected.

By driving the supporting roller 6 from the electrode 2 through separate wheels or gears, the workpiece 1 may be arranged to rotate at a peripheral speed different from that of the electrode 2 if desired and further by inclining the axis of the supporting roller 7 the workpiece may be automatically traversed as the work proceeds.

In the embodiment schematically illustrated in Figure 2 the workpiece 1 is rotated between the working electrode 32 and a backing roller 30, driven at a lower peripheral speed than the electrode 32 and its underface bears on a supporting blade 31 by which it is maintained at positive polarity by electric current supplied through such blade 31.

The electrode 32 which is maintained at negative polarity and which may be perforated and hollow arranged within a porous non conducting co-axial casing or envelope 33 which latter bears on and with the supporting or backing roller 30 induces rotation of the workpiece 1 in a direction opposite to that of the electrode.

The peripheral speed at which the workpiece is driven is smaller than that of the electrode envelope 33 because a backing wheel 30 is driven to rotate at a lower peripheral speed than the electrode envelope 33 and as the surface of the backing wheel 30 is made to have a higher coefficient of friction than that of the electrode envelope, so that the peripheral speed of the workpiece is preponderantly determined by that of the backing wheel 30, there will be a slip between envelope 33 and workpiece which will result in a mechanical abrading effect, particularly if the electrode casing is made of abrasive material.

In this case electrolyte is fed also to the interior of the hollow electrode and in the operation of the machine flows through the porous casing or envelope bathing the said electrode and workpiece as does electrolyte fed to the working zone through the feed pipe 25.

Means such as asymmetric couples may be included in or associated with the input or discharge circuit to prevent cyclic or transient reversal of polarity between the workpiece and negative electrode and similarly means may be furnished for regulating the spacing between them or the pressure with which they are brought together through the agency of the supporting rollers or guide blocks.

It will be appreciated that by arranging both the cutter member and workpiece as surfaces of revolution during the cutting operation and particularly where there is a peripheral speed differential and the supporting rollers bear on the surface being worked, extremely accurate finishes may be obtained.

What I claim is:

1. Apparatus for working materials by electric disintegration including a base, a pair of spaced supporting members, means rotatably mounting said supporting members on said base whereby to freely, rotatably support a workpiece therebetween, the rotational axes of the supporting members being substantially parallel, an electrode rotatably mounted on said base about an axis parallel to the axes of the supporting members, said electrode engaging one of said supporting members, means for rotating said electrode whereby a workpiece supported by said supporting members will be rotated in the same direction as the electrode and in spaced relation thereto, the first-mentioned means including mechanism for mounting one supporting member for movement toward and away from the electrode such that a workpiece supported between the supporting members may be moved to a desired position relative to the electrode, an electric circuit for imparting opposite polarity to the electrode and a workpiece.

2. An apparatus for working materials by electric disintegration, a base, a first supporting member mounted on said base, a second supporting member mounted on said base in spaced relation to the first supporting member whereby a workpiece may be freely, rotatably supported therebetween, an electrode mounted on said base for rotation about an axis spaced from both of the supporting members and in spaced relation to a workpiece supported thereby, means for rotating said electrode and at least one of said supporting members, the first supporting member being rotatable and formed of electrically insulating material and said electrode engages the first supporting member.

References Cited in the file of this patent

UNITED STATES PATENTS

| | | |
|---|---|---|
| 1,410,761 | Kirkland | Mar. 28, 1922 |
| 1,915,029 | Naylor | June 20, 1933 |
| 2,059,236 | Holslag | Nov. 3, 1936 |
| 2,526,423 | Rudorff | Oct. 17, 1950 |
| 2,777,046 | Vang | Jan. 8, 1957 |

OTHER REFERENCES

National Research Council, Report No. MAB–18–M, January 1952, pp. 2–6.